United States Patent
Chen et al.

(10) Patent No.: US 11,959,896 B2
(45) Date of Patent: Apr. 16, 2024

(54) TRANSFER LINE, GCMS ARRANGEMENT AND MOUNTING ASSEMBLY

(71) Applicant: Micromass UK Limited, Wilmslow (GB)

(72) Inventors: Carl Chen, Victoria (AU); Richard Jarrold, Porlock (GB); Pham Hoang Vu Ngo, Singapore (SG); William Ngo, Singapore (SG); Dennis Ong, Singapore (SG); Richard Tyldesley-Worster, Wilmslow (GB); Arvind Rangan, Singapore (SG); Chris Wheeldon, Wilmslow (GB)

(73) Assignee: Micromass UK Limited, Wilmslow (GB)

( * ) Notice: Subject to any disclaimer, the term of this patent is extended or adjusted under 35 U.S.C. 154(b) by 566 days.

(21) Appl. No.: 17/057,741

(22) PCT Filed: May 31, 2019

(86) PCT No.: PCT/GB2019/051492
§ 371 (c)(1),
(2) Date: Nov. 23, 2020

(87) PCT Pub. No.: WO2019/229451
PCT Pub. Date: Dec. 5, 2019

(65) Prior Publication Data
US 2021/0199632 A1    Jul. 1, 2021

(30) Foreign Application Priority Data

Jun. 1, 2018  (SG) .............................. 10201804692T
Jul. 2, 2018  (GB) ...................................... 1810830

(51) Int. Cl.
*G01N 30/72*    (2006.01)
*G01N 27/18*    (2006.01)
(Continued)

(52) U.S. Cl.
CPC ......... *G01N 30/7206* (2013.01); *G01N 27/18* (2013.01); *G01N 30/62* (2013.01);
(Continued)

(58) Field of Classification Search
CPC ..... H01J 49/0422; G01N 30/66; G01N 30/62; G01N 30/78; G01N 27/18
(Continued)

(56) References Cited

U.S. PATENT DOCUMENTS 4,641,541 A * 2/1987 Sharp ................. G01N 30/7213
                                                        73/864.81
4,804,839 A * 2/1989 Broadbent ......... G01N 30/7206
                                                        250/281
(Continued)

FOREIGN PATENT DOCUMENTS

CA    2783028 A1 *  1/2013  ......... G01N 30/7206
CN  204809187 U    11/2015
(Continued)

OTHER PUBLICATIONS

Combined Search and Examination Report in UK Patent Application No. GB1810830.8 dated Jan. 7, 2019.
(Continued)

*Primary Examiner* — Stephanie E Bloss
*Assistant Examiner* — Kevin C Butler
(74) *Attorney, Agent, or Firm* — Schmeiser, Olsen & Watts LLP

(57) ABSTRACT

A transfer line for a GCMS arrangement, the transfer line comprising: a transfer probe having a probe bore to receive a GC column; a sealing cap movably mounted at a first end of the transfer probe; and a resilient element arranged to bias the sealing cap away from the first end of the transfer probe.

20 Claims, 10 Drawing Sheets

(51) Int. Cl.
*G01N 30/02* (2006.01)
*G01N 30/62* (2006.01)
*G01N 30/66* (2006.01)
*G01N 30/78* (2006.01)
*H01J 49/04* (2006.01)

(52) U.S. Cl.
CPC ............ *G01N 30/66* (2013.01); *G01N 30/78* (2013.01); *H01J 49/0422* (2013.01); *G01N 2030/025* (2013.01)

(58) Field of Classification Search
USPC .......................................................... 73/23.4
See application file for complete search history.

(56) References Cited

U.S. PATENT DOCUMENTS

| | | | | |
|---|---|---|---|---|
| 4,985,625 | A * | 1/1991 | Hurst | H01J 49/0468 250/281 |
| 6,102,449 | A * | 8/2000 | Welsh | F16L 49/06 285/332 |
| 7,872,224 | B2 * | 1/2011 | Finch | G01N 30/7246 250/281 |
| 8,710,431 | B2 | 4/2014 | Newton | |
| 8,710,432 | B2 | 4/2014 | Newton | |
| 8,723,109 | B2 | 5/2014 | Newton | |
| 8,759,758 | B2 * | 6/2014 | Steiner | H01J 49/04 250/288 |
| 8,794,676 | B2 * | 8/2014 | Murphy | B01L 3/565 285/332.1 |
| 9,053,913 | B2 | 6/2015 | Ferrara et al. | |
| 9,927,407 | B2 | 3/2018 | Ferrara et al. | |
| 9,947,522 | B2 | 4/2018 | Trivett et al. | |
| 10,037,875 | B2 | 7/2018 | O'Brien et al. | |
| 10,100,509 | B2 | 10/2018 | Smith et al. | |
| 11,175,267 | B2 * | 11/2021 | Jarrold | G01N 30/6004 |
| 11,428,674 | B2 * | 8/2022 | Kirby | F16L 19/00 |
| 2003/0122068 | A1 * | 7/2003 | Berking | H01J 49/04 250/288 |
| 2005/0211098 | A1 * | 9/2005 | Shimomura | G01N 30/72 96/101 |
| 2008/0083874 | A1 | 4/2008 | Prest et al. | |
| 2012/0126108 | A1 | 5/2012 | Newton | |
| 2013/0042469 | A1 | 2/2013 | Ferrara et al. | |
| 2013/0256523 | A1 | 10/2013 | Steiner et al. | |
| 2015/0323509 | A1 * | 11/2015 | Kirby | B01D 15/10 29/280 |
| 2015/0369402 | A1 * | 12/2015 | Pa | G01N 30/6026 285/386 |
| 2016/0018369 | A1 * | 1/2016 | Ferrara | G01N 30/02 29/428 |
| 2017/0284983 | A1 | 10/2017 | Jarrold et al. | |
| 2017/0292641 | A1 | 10/2017 | Trivett et al. | |
| 2017/0294296 | A1 * | 10/2017 | Trivett | H01J 49/0404 |
| 2018/0017534 | A1 | 1/2018 | Robson et al. | |
| 2021/0190243 | A1 * | 6/2021 | Norman | G01N 30/6026 |
| 2021/0199632 | A1 * | 7/2021 | Chen | H01J 49/0422 |
| 2021/0210323 | A1 * | 7/2021 | Booth | H01J 49/067 |
| 2021/0265154 | A1 * | 8/2021 | Booth | H01J 49/147 |

FOREIGN PATENT DOCUMENTS

| | | | | |
|---|---|---|---|---|
| CN | 105319311 | A | | 2/2016 |
| CN | 105866306 | A | | 8/2016 |
| CN | 205861023 | U | * | 1/2017 |
| DE | 102017106081 | A1 | * | 10/2017 ............. F16L 15/08 |
| DE | 102017106089 | B4 | * | 5/2023 ......... G01N 30/7233 |
| EP | 298597 | A | * | 1/1989 ......... G01N 30/7206 |
| EP | 0298597 | A2 | | 1/1989 |
| EP | 0488371 | A2 | | 6/1992 |
| GB | 849490 | A | | 9/1960 |
| GB | 2494502 | A | | 3/2013 |
| JP | 4356491 | B2 | * | 11/2009 ............. G01N 30/72 |
| WO | 2010100507 | A1 | | 9/2010 |
| WO | 2010100508 | A1 | | 9/2010 |
| WO | 2010100509 | A1 | | 9/2010 |
| WO | 2013012834 | A1 | | 1/2013 |
| WO | WO-2013012834 | A1 | * | 1/2013 ............. G01N 30/02 |
| WO | WO-2013095964 | A2 | * | 6/2013 ............. B01D 15/10 |
| WO | WO-2014123618 | A1 | * | 8/2014 ............. F16L 15/08 |
| WO | 2015040384 | A1 | | 3/2015 |
| WO | 2018013826 | A1 | | 1/2018 |
| WO | WO-2019229445 | A1 | * | 12/2019 ............. H01J 27/022 |
| WO | WO-2019229451 | A1 | * | 12/2019 ......... G01N 30/7206 |

OTHER PUBLICATIONS

Combined Search and Examination Report in UK Patent Application No. GB1907767.6 dated Nov. 5, 2019.
International Search Report and Written Opinion in PCT/GB2019/051492 dated Dec. 5, 2019.

* cited by examiner

TRANSFER LINE, GCMS ARRANGEMENT AND MOUNTING ASSEMBLY

BACKGROUND TO THE INVENTION

The present invention relates generally to a transfer line. The invention also relates to a GCMS arrangement and a mounting assembly.

Gas chromatography (GC) is a well-known analytical separation technique. A column containing a stationary phase is arranged in a GC oven. A sample is introduced into the column along with a mobile phase (carrier gas) and heated by the GC oven. The sample interacts with the stationary phase in the column and the components of the sample elute from the end of the column at different rates depending on their chemical and physical properties and affinity to the stationary phase. The mobile phase may comprise, for example, an inert or non-reactive gas such as helium or nitrogen.

It is known to interface the GC oven with a mass spectrometer (MS)—a so-called GC/MS system arrangement—for analysis of the separated components of the sample Generally speaking, a mass spectrometer comprises an ion source, a mass analyser and a detector. There are different types of ion sources. The ion source of a mass spectrometer of the type referred to in this specification includes an inner source assembly and an outer source assembly. The incoming components (GC eluent) of the sample from the GC are first introduced into the inner source assembly via a transfer line. Here, they are ionised by an ion source, upon colliding with electrons emitted by one or more filaments and are then emitted towards the outer source assembly which guides the ions through a series of ion lenses (extraction lens stack) towards an analyser and detector of the mass spectrometer. The extraction lens stack is typically secured to the analyser housing. In use, the inner source assembly mates with the outer source assembly.

The terms 'inner source' and 'outer source' are used herein, in line with the above general definition, to increase clarity. Nevertheless, the respective components of the inner and outer source assemblies are likewise components of the source assembly as a whole.

The inner source may adopt one of a number of types of ion source, including electron ionisation (EI) and chemical ionisation (CI). The sample enters the ion source from the gas chromatography column via a transfer line into a volume of an inner source housing adjacent one or more filaments. Electrons emitted by the filament(s) interact with the sample molecules which serve to ionise them. A charged repeller then repels the positive ions towards the lens stack of the outer source assembly.

Mass spectrometers are highly sensitive and accurate pieces of apparatus, and require regular maintenance and cleaning in order to maintain their optimal conditions of operation. It is beneficial if at least some of the maintenance can be carried out by a lab technician, on site, using conventional tools (if any). There is a desire to ensure that the maintenance is as straightforward as possible, reducing the opportunities for errors, minimising down time of the apparatus, and ensuring that the mass spectrometer operates effectively when reassembled.

The GC and MS units are interfaced with one another via a heated transfer line. The GC eluent flows from the GC oven into the ion source via the transfer line. Heating of the transfer line is typical of the art since efficient GC separation typically happens at elevated temperatures and the transfer line needs to be correspondingly heated (more precisely, temperature-controlled) in order to reduce any temperature-dependent chromatographic dispersion. The transfer line comprises a transfer probe which must be fluidly mated with an inlet of the source assembly of the MS unit. The GC column is held within at least a part of the transfer line.

The transfer line may be associated with (e.g. mounted to) the MS unit, and be selectively engaged with the GC unit/oven. For example, the transfer line may be received in an aperture in the side of the GC unit such that it protrudes into the GC oven within.

In other known systems, such as that disclosed in EP0488371, the transfer line is associated with the GC unit. The transfer line (and optionally the GC unit itself) is translated towards the source assembly such that the distal end of the transfer line is inserted into a port on the source assembly. When components of the source assembly need to be removed, these known arrangements necessitate the disconnection and translation of the transfer line away from the source assembly.

The present invention seeks to address at least some of the problems associated with known GCMS arrangements.

SUMMARY OF THE INVENTION

One aspect of the present invention provides a transfer line for a GCMS arrangement, the transfer line comprising:
  a transfer probe having a probe bore to receive a GC column;
  a sealing cap movably mounted at a first end of the transfer probe; and
  a resilient element arranged to bias the sealing cap away from the first end of the transfer probe.

In at least one embodiment, the transfer line further comprises a sleeve received within the probe bore, the sleeve having a sleeve bore to receive the GC column.

In at least one embodiment, the sleeve comprises an outer tube and an inner tube, the inner tube having an inner tube bore to receive the GC column.

In at least one embodiment, the outer tube is comprised of copper.

In at least one embodiment, the inner tube is comprised of stainless steel.

In at least one embodiment, the first end of the sleeve is spaced axially inwardly from the first end of the transfer probe.

In at least one embodiment, the probe bore comprises an outlet port at said first end of the transfer probe.

In at least one embodiment, the transfer probe comprises a tip at said first end, the outer surface of said tip being substantially cylindrical.

In at least one embodiment, the sealing cap is generally cylindrical and arranged to receive at least a part of the first end of the transfer probe therein.

In at least one embodiment, the sealing cap comprises an axial sealing face.

In at least one embodiment, the sealing face is surrounded by a radial chamfer surface.

In at least one embodiment, the sealing cap comprises a cap aperture.

In at least one embodiment, the cap aperture receives the first end of the transfer probe with a sliding fit.

In at least one embodiment, there is further provided a sealing element arranged between the sealing cap and the transfer probe.

In at least one embodiment, the resilient element is a spring.

In at least one embodiment, the resilient element is integrally formed with the sealing cap.

In at least one embodiment, the sealing cap is receivable in the first end of the transfer probe.

In at least one embodiment, the sealing cap is comprised of high-temperature engineering plastics, for example one of PEEK, Ultem and Vespel.

In at least one embodiment, the sealing cap is comprised of polyimide-based engineering plastics.

In at least one embodiment, the sealing cap is comprised of Vespel SCP-5000.

In at least one embodiment, the transfer probe further comprises at least one auxiliary fluid bore, for delivering at least one auxiliary fluid to the first end of the transfer probe.

In at least one embodiment, the at least one auxiliary fluid bore is substantially parallel to the probe bore.

In at least one embodiment, the transfer probe further comprises at least one auxiliary fluid supply port, for supplying at least one auxiliary fluid to the auxiliary fluid bore.

In at least one embodiment, the first end of the transfer probe comprises at least one auxiliary fluid transfer port in fluid communication with the at least one auxiliary fluid bore.

In at least one embodiment, the sealing cap is selectively retained on the transfer probe.

In at least one embodiment, the sealing cap is retained on the transfer probe with a bayonet fitting.

Another aspect of the present invention provides a GCMS arrangement comprising:
- a transfer line; and
- a source block for an ion source, the source block comprising an engagement surface provided with at least one transfer port for fluid communication with the transfer line, configured such that, in use, the engagement surface causes the sealing cap to be displaced relative to the transfer probe until the probe bore of the sealing cap is substantially aligned with the transfer port.

In at least one embodiment, the transfer port is provided in a recess in the engagement surface.

In at least one embodiment, the recess is chamfered.

Another aspect of the present invention provides a method of assembling a GCMS arrangement comprising:
- providing a transfer line;
- providing a source block for an ion source, the source block comprising an engagement surface provided with at least one transfer port;
- arranging the source block such that said transfer port is parallel to the transfer line;
- translating the source block in a direction perpendicular to the longitudinal axis of the transfer line until the sealing cap of the transfer line engages with the engagement surface of the source block, causing the sealing cap to be displaced inwardly on the transfer probe;
- translating the source block further in said direction until the probe bore of the transfer probe is substantially co-axial with the said transfer port of the source block.

In at least one embodiment, the at least one transfer port is provided in a recess in the engagement surface and when the probe bore of the transfer probe is substantially co-axial with the transfer port of the source block, the resilient element causes the sealing cap to be received in the recess.

Another aspect of the present invention provides a transfer line for a GCMS arrangement, the transfer line comprising a transfer probe having:
- a probe bore to receive a GC column; and
- at least one auxiliary fluid bore, for delivering at least one auxiliary fluid to the first end of the transfer probe.

In at least one embodiment, at least one auxiliary fluid bore is substantially parallel to the probe bore.

In at least one embodiment, the transfer probe further comprises at least one auxiliary fluid supply port, for supplying at least one auxiliary fluid to the auxiliary fluid bore.

In at least one embodiment, the first end of the transfer probe comprises at least one auxiliary fluid transfer port in fluid communication with at least one auxiliary fluid bore.

Another aspect of the present invention provides a transfer line for a GCMS arrangement, the transfer line comprising a manifold to retain a GC column in the transfer line, the manifold comprising an aperture provided with at least two radially inwardly extending legs to retain said GC column.

In at least one embodiment, the manifold comprises three radially inwardly extending legs.

In at least one embodiment, the legs are substantially equally spaced around the circumference of the aperture.

In at least one embodiment, the transfer line further comprises a GC column holder retained between the legs and comprising a holder bore to receive a GC column therein.

In at least one embodiment, the GC column holder is tubular.

In at least one embodiment, the transfer line further comprises a sleeve received in the GC column holder, the sleeve having a sleeve bore to receive the GC column.

In at least one embodiment, the sleeve comprises an outer tube and an inner tube, the inner tube having an inner tube bore to receive the GC column.

In at least one embodiment, the GC column holder is comprised of ceramic.

Another aspect of the present invention provides a mounting assembly for a GCMS arrangement, comprising:
- a manifold of a transfer line to retain a GC column in the transfer line; and
- a mounting platform,
- the manifold axially spaced from the mounting platform by a plurality of pillars.

In at least one embodiment, the mounting platform comprises a substantially planar mounting plate; and the manifold comprises a substantially planar manifold plate, the mounting plate and manifold plates being arranged substantially parallel to one another.

In at least one embodiment, the pillars are substantially equally spaced around the circumference of the transfer line.

Another aspect of the present invention provides a mounting assembly for a GCMS arrangement, comprising:
- a transfer probe having:
  - a probe bore to receive a GC column; and
  - at least one auxiliary fluid bore for delivering at least one auxiliary fluid to the first end of the transfer probe; and
- a mounting platform comprising at least one auxiliary fluid supply port in fluid connection with the at least one auxiliary fluid bore and connectable to an auxiliary fluid supply.

In at least one embodiment, the mounting assembly further comprises a connecting conduit fluidly connected between the at least one auxiliary fluid support port and the at least one auxiliary fluid bore.

Another aspect of the present invention provides a source block for an ion source, the source block comprising an engagement surface for engagement with a transfer probe in use, the transfer probe having a probe bore to receive a GC column and at least one auxiliary fluid bore, the probe bore and the at least one auxiliary fluid bore terminating on an axial end face of the transfer probe and spaced apart from one another, wherein the source block comprises a transfer port and at least one auxiliary fluid transfer channel, wherein the transfer port and at least one auxiliary fluid transfer channels are arranged so as to substantially align, in use, with a respective one of the probe bore and at the at least one auxiliary fluid bore.

In at least one embodiment, the transfer port and at least one auxiliary fluid channel are fluidly connected to one another remote from the engagement surface.

In at least one embodiment, the transfer port and at least one auxiliary fluid channel are non-parallel.

In at least one embodiment, the source block further comprises a source block outlet port and wherein the transfer port and at least one auxiliary fluid transfer channel are fluidly connected to the source block outlet port.

In at least one embodiment, the at least one auxiliary fluid transfer channel is fluidly connected to the transfer port along its axial length.

DESCRIPTION OF THE DRAWINGS

Embodiments of the present invention will now be described, by way of non-limiting example only, with reference to the figures in which.

DETAILED DESCRIPTION OF THE DRAWINGS

Sealing Cap and GCMS Arrangement

Figure 1:
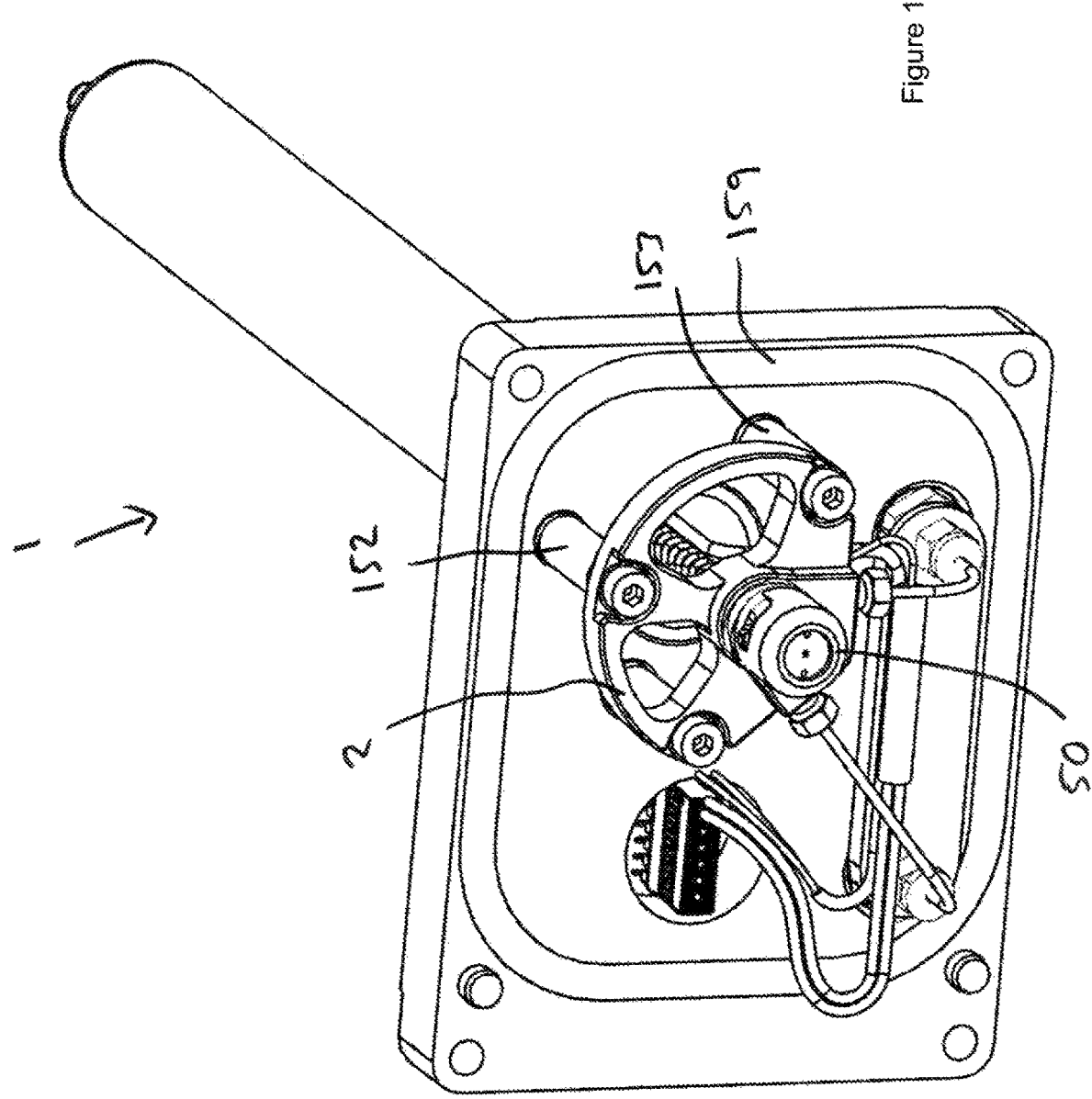
FIG. 1 illustrates a transfer line according to one embodiment of the present invention.
Figure 4:
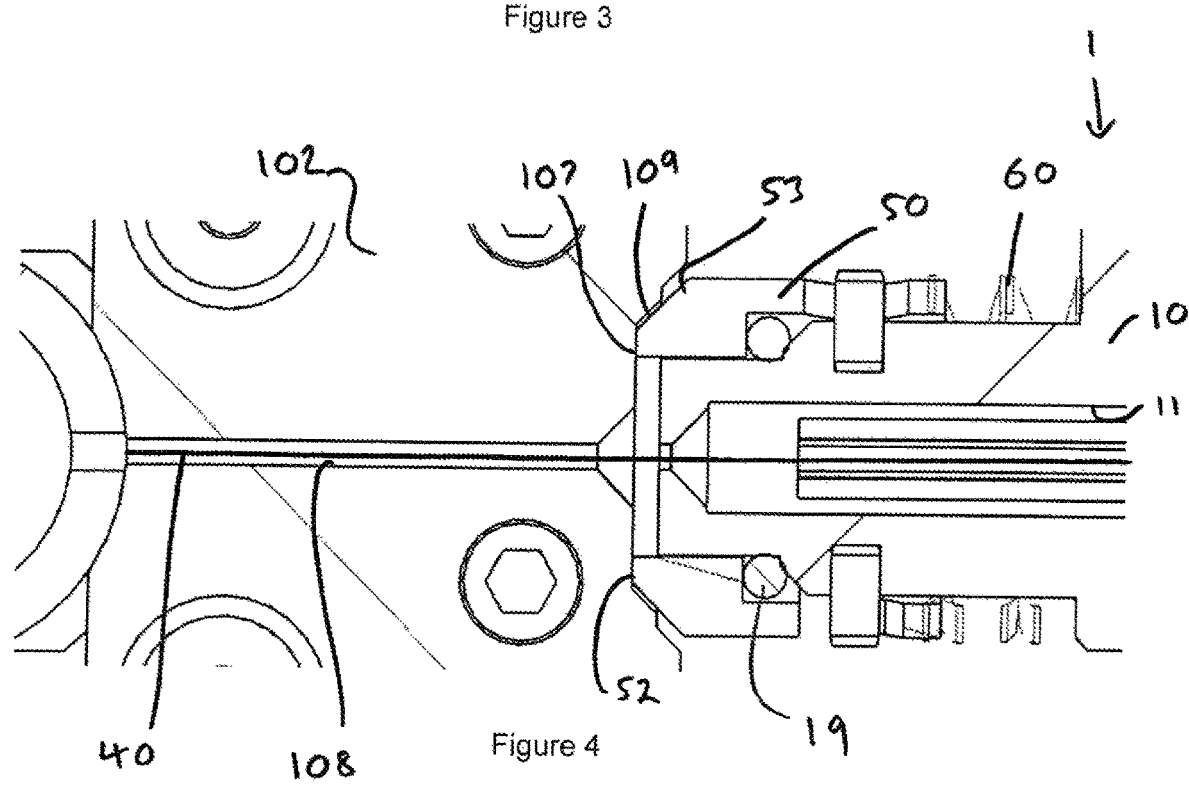
FIG. 4 illustrates a cross-section of the transfer line of FIG. 2 engaging with the source block of FIG. 3.

FIG. 1 illustrates a transfer line 1 for a GCMS arrangement. The first end of the transfer line 1 is shown in cross-section in FIG. 2A. The transfer line 1 comprises a transfer probe 10 having a probe bore 11 to receive a GC column 40. The GC column 40 is shown in FIG. 4, but not FIG. 2A or 2B. The first end of the transfer line 1 is that which interfaces with the MS unit. The second end (not shown in the figures), opposite the first end, is that which interfaces with the GC unit.

The probe bore 11 comprises a main section 12 and an outlet port 13 arranged at a first end of the transfer probe 10. The inner surface of the main section 12 of the probe bore 11 is substantially cylindrical having a substantially identical diameter along its length. The outlet port 13 may be of a different cross-section and/or diameter to the main section 12. In the embodiment shown in FIG. 2A, the outlet port 13 comprises at least a conical section adjacent the main section 12 of the probe bore 11, and an outlet section which is substantially cylindrical, having a diameter which is less than that of the main section 12 of the probe bore 11. The first end of the transfer probe 10 comprises an axial end face 14. The axial end face 14 is substantially planar and the outlet port 13 of the probe bore 11 is arranged substantially in the centre of the axial end face 14 of the transfer probe 10.

Figure 2A:
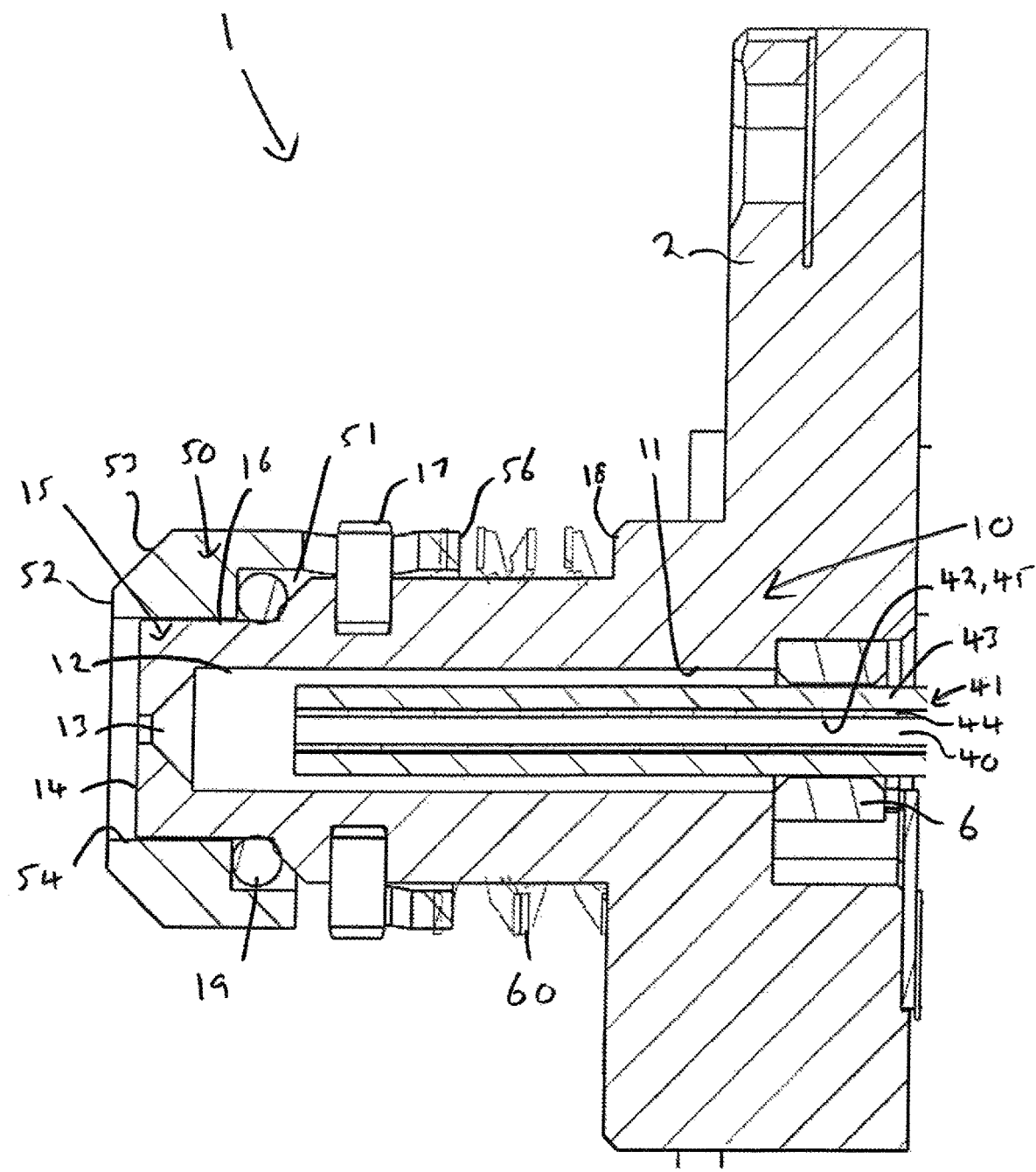
FIG. 2A illustrates a cross-section of part of the transfer line of FIG. 1.

As shown in FIG. 2A, the transfer line 1 may further comprise a sleeve 41 which is received within the probe bore 11. The sleeve 41 comprises a sleeve bore 42 for receiving the GC column 40 (not shown in FIG. 2A) therein. In at least one embodiment, the sleeve 41 comprises an outer tube 43 and an inner tube 44, wherein the inner tube 44 comprises an inner tube bore 45 for receiving the GC column 40 therein. The outer tube 43 may comprise copper. The inner tube 44 may comprise stainless steel.

In the embodiment shown, the first end of the sleeve 41 is spaced axially inwardly from the first end (i.e. the axial end face 14) of the transfer probe 10. Towards the other end of the GC column (not shown in FIGS. 2A and 2B), i.e. at the end closer to the GC unit, there may be provided a heater element to heat the internal volume of the GC column 40. In the section of the transfer line 1 shown in FIG. 2, there may be no heating. The sleeve 41 may serve to thermally conduct and retain the heat, especially under vacuum in the GC column 40 in the areas in which it is unheated. The sleeve 41 may serve to ensure a consistent temperature gradient between the heated section of the transfer line 1 and the source block (described later).

The first end of the transfer line 10 comprises a tip 15. An outer surface 16 of the tip 15 may be substantially cylindrical and extend along at least a portion of the first end of the transfer line 1, as shown in FIG. 2.

The transfer probe 10 may be connected to, or be formed integrally with, a manifold 2. In the embodiment shown, the transfer probe 10 and manifold 2 are integrally formed with one another, with the transfer probe 10 extending perpendicularly from the generally planar surface of the manifold 2.

Figure 10:
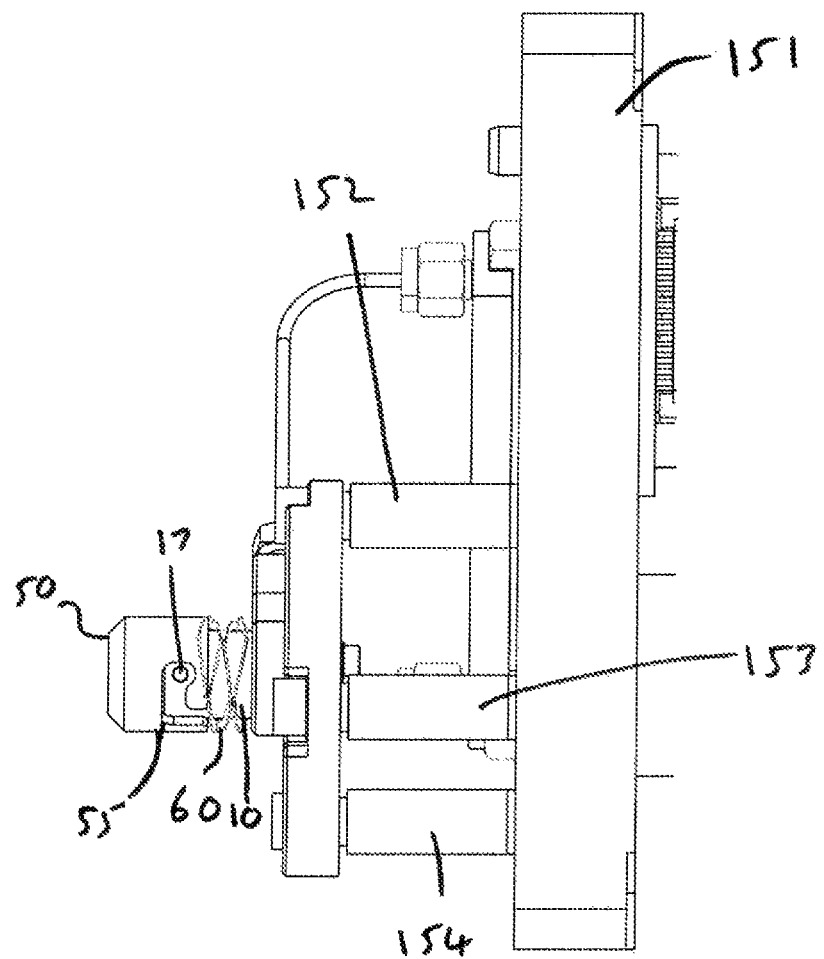
FIG. 10 illustrates a side view of a part of the transfer line shown in FIG. 1.

The transfer probe 10 may further comprise at least one bayonet pin 17 extending radially outwardly, for receipt within a corresponding bayonet slots 55, shown in FIG. 10. In the embodiment shown, there are two pins 17 and two bayonet slots 55.

Furthermore, the transfer probe 10 may comprise an annular surface 18. The sealing cap 50 is generally cylindrical and is arranged to receive at least a part of the first end (e.g. the tip) of the transfer probe 10 therein, as illustrated in FIG. 2. More specifically, the sealing cap 50 defines an inner chamber 51 which receives the first end of the transfer probe 10. The sealing cap 50 comprises an axial sealing face 52. The axial sealing face 52 may be substantially planar, and perpendicular to the longitudinal axis of the transfer probe 10. The sealing face 52 is surrounded by a radial chamfer surface 53. In the embodiment shown, the chamfer surface 53 is arranged about 45° to the surface of the axial sealing face 52. Furthermore, the sealing cap 50 comprises a cap aperture 54, which is substantially cylindrical. In the embodiment shown, the diameter of the cap aperture 54 substantially corresponds to the outer diameter of the outer surface 16 of the tip 15 of the transfer probe 10.

Accordingly, the cap aperture 54 receives the first end (e.g. the tip 15) of the transfer probe 10 with a substantially sliding fit. The cap aperture 54 and/or the outer surface 16 of the tip 15 may be provided with a friction reducing material, so as to ensure the smooth linear translation of the sealing cap 50 in relation to the first end of the transfer probe 10. The axial length of the cap aperture 54 and/or the axial length of the cylindrical outer surface 16 of the tip 15 are, in at least one embodiment, longer than the maximum axial extent of travel of the sealing cap 50 relative to the first end of the transfer probe 10. Accordingly, regardless of the linear position of the sealing cap 50 relative to the first end of the transfer probe 10, the sealing interface between the cap aperture 54 and the outer surface 16 is sufficient to provide sufficient flow resistance to minimize any leakage along the interface. In at least one embodiment, the axial length of the cap aperture 54 and/or the axial length of the cylindrical outer surface 16 of the tip 15 is/are longer than the maximum axial extent of travel of the sealing cap 50 relative to the first end of the transfer probe 10 by a factor of 2, 3, 4, 5, 6, 7, 8, 9 or 10.

In the embodiments shown, there is provided a sealing element 19 between the sealing cap 50 and the transfer probe 10. The sealing element 19 may be an O-ring. The sealing element 19 is captured in the inner chamber 51 of the sealing cap 50. The sealing element 19 may be retained therein due to the larger diameter of the main part of the transfer probe 10, adjacent the tip 15. The inner diameter of the sealing element 19 may be substantially the same as, or less than, the diameter of the outer surface 16 of the tip 15. In another embodiment, not shown, the sealing element 19 may rest within an annular groove provided on either or both of the outer surface 16 of the tip 15 and the cap aperture 54. There may be more than one, or other forms of, sealing element 19.

The sealing element 19 is not essential. An adequate seal may be created between the surface 16 of the tip 15 of the transfer probe 10 and the cap aperture 54 alone, without the need for a sealing element 19.

The other end of the sealing cap 50 (opposite the sealing face 52) presents an opposing axial end face 56. A resilient element 60 may be arranged to bias the sealing cap 50 away from the first end of the transfer probe 10. In the embodiment shown in FIG. 2, the resilient element 60 is a spring which is arranged between the annular surface 18 of the transfer probe 10 and the axial end face 56 of the sealing cap 50. With reference to FIG. 10, when the sealing cap 50 is mounted on the transfer line 10, the resilient element 60 may be held in compression, such that the bayonet pin/protrusion 17 is caused to travel to the end of the bayonet slot 55 (described later).

In the embodiment shown, the resilient element (spring) 60 is a discrete item from the sealing cap 50 and the transfer probe 10. In another embodiment, not shown, the resilient element 60 may be integrally formed with the sealing cap 50.

In the embodiment shown, the first end of the transfer probe 10 is receivable within the sealing cap 50. In another embodiment (not shown), the sealing cap 50 may be receivable in the first end of the transfer probe 10.

The sealing cap 50 may be comprised of an electrically non-conductive material. The sealing cap 50 may alternatively be comprised of a conductive material, for example if the source block does not have a floating voltage and/or if an electrically insulating barrier is applied (for example anodizing) to the sealing cap 50. In some embodiments, the material of the sealing cap 50 may withstand temperatures of at least 250° C. The sealing cap 50 may comprise Vespel SCP-5000. The material of the sealing cap 50 may be compliant. For example, the material may comprise spring, rubber or other flexible materials which are effective in creating a seal when the sealing cap 50 is engaged against a surface.

Figure 5:
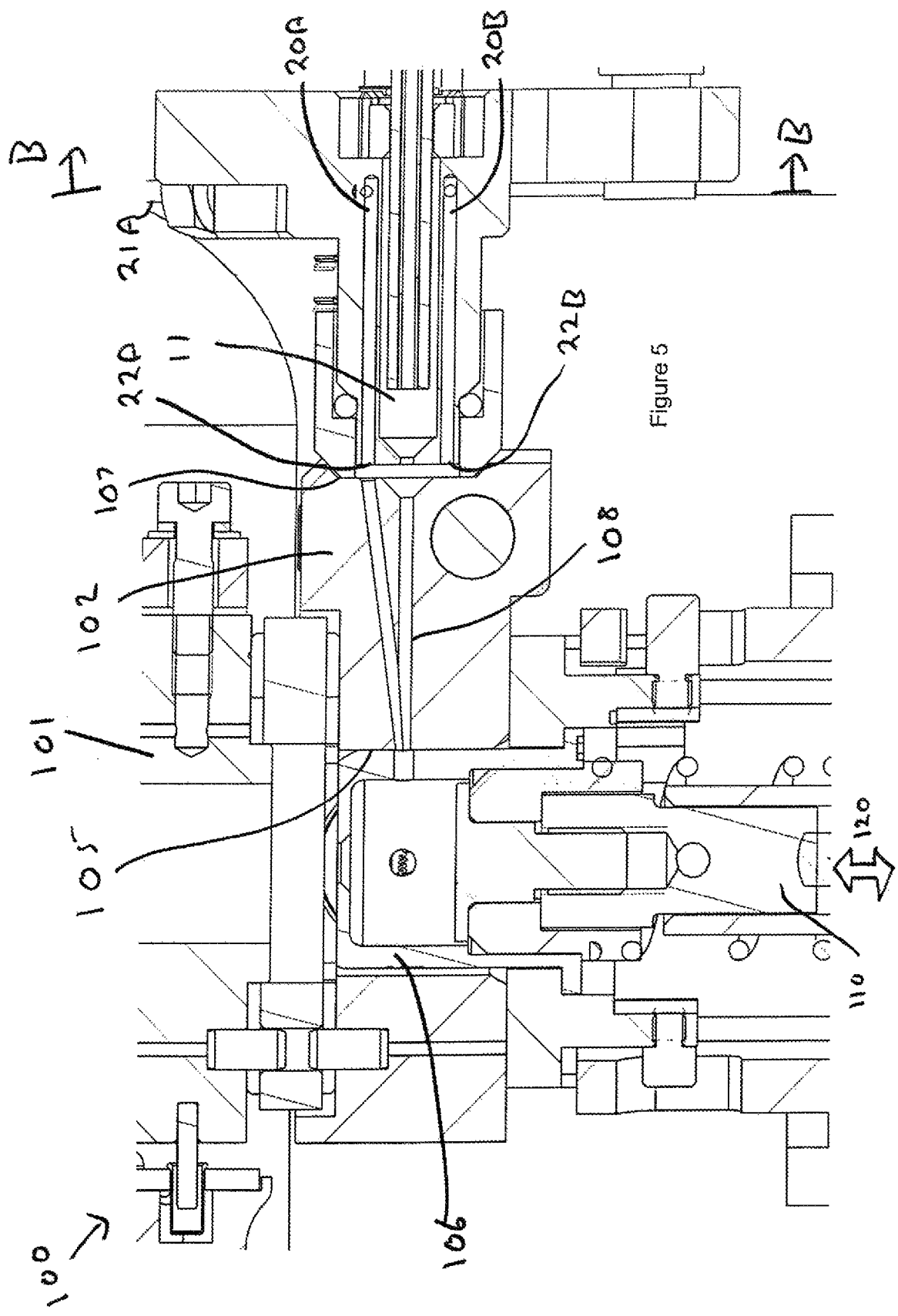
FIG. 5 illustrates a cross-section of a GCMS arrangement.
Figure 6:
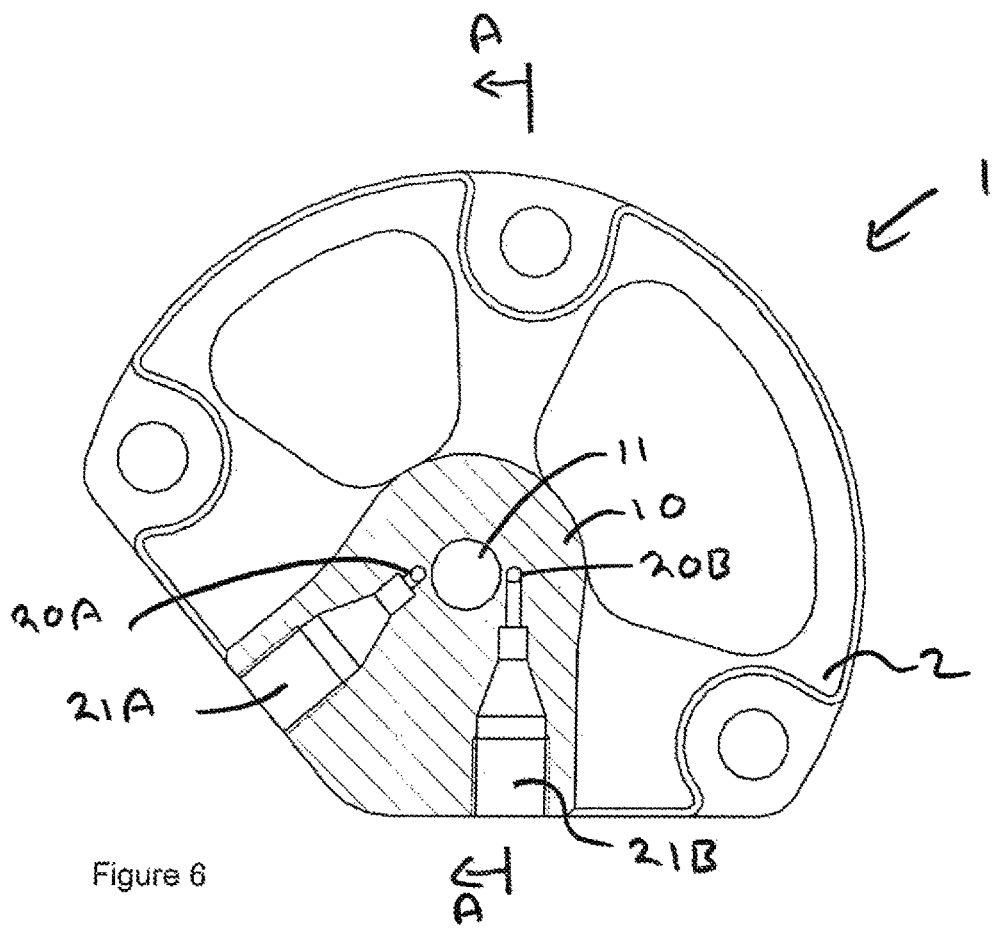
FIG. 6 illustrates a radial cross-section of a transfer line embodying the present invention.

FIG. 6 illustrates a radial cross-section of the transfer line 1 shown in FIG. 5, along line B-B. The cross-section of FIG. 6 shows the manifold 2 with the probe bore 11 illustrated as being in the centre of the transfer probe 10. Also illustrated in FIGS. 5 and 6 are two auxiliary fluid bores 20A, 20B for delivering at least one auxiliary fluid to the first end 14 of the transfer probe 10. The auxiliary fluid bores 20A, 20B are substantially parallel to the probe bore 11.

The transfer probe 10 further comprises two auxiliary fluid supply ports 21A, 21B for supplying at least one auxiliary fluid to the respective auxiliary fluid bores 20A, 20B.

Figure 7:
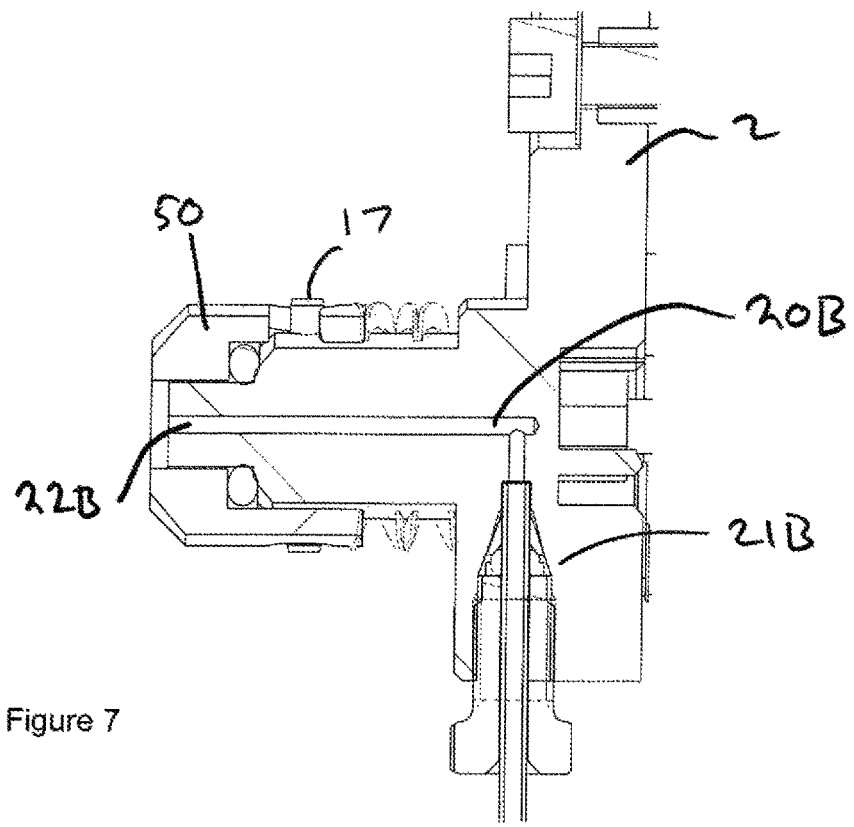
FIG. 7 illustrates an axial cross-section of the transfer line shown of FIG. 6, along line A-A.

FIG. 7 illustrates a cross-section of the transfer line along line A-A of FIG. 6, the auxiliary fluid supply port 21B is substantially perpendicular to the longitudinal axis of the auxiliary fluid bore 20B. In at least one embodiment, the auxiliary fluid bores 20A, 20B and at least a part of the auxiliary fluid supply ports 21A, 21B are cross drilled into the transfer probe 10 and manifold 2. A benefit of the provision of auxiliary fluid bores 20A, 20B in addition to the probe bore 11 is that multiple gases may be delivered through the transfer line 1 into an ion source. This avoids the need for an operator of the GCMS apparatus to separately attach auxiliary fluid supplies to the ion source. Instead, they are provided by the transfer probe 10 of the transfer line 1. The auxiliary fluids may include reference gas and/or chemical ionisation (CI) gas.

The axial end face 14 of the transfer probe 10 comprises auxiliary fluid transfer port 22A, 22B in fluid communication with the auxiliary fluid bores 20A, 20B. Accordingly, in an embodiment comprising two auxiliary fluid bores 20A, 20B, the axial end face 14 of the transfer probe 10 comprises a central outlet port 13 of the probe bore 11 and two auxiliary fluid transfer ports 22A, 22B either side thereof, such that the sample and carrier gas from the GC column and any auxiliary fluids can be provided to the ion source by the transfer probe 10.

The sealing cap 50 is selectively retained on the transfer probe 10. In the embodiment shown in FIG. 10, the sealing cap 50 is retained on the transfer probe 10 by a bayonet fitting, which may comprise two radially extending bayonet pins 17 provided on the outer surface of the transfer probe 10 which are receivable in respective bayonet slots 55 on the sealing cap 50. The bayonet slot 55 comprises a first, second and third section. The first section of the slot represents the mouth of the bayonet slot 55, and is for receiving the pin 17 therein during assembly. A user urges the sealing cap 50 onto the first end of the transfer probe 10 such that the pins 17 travels along the first section of the respective bayonet slots 55. When a respective pin 17 reaches the axial extent of the first section of the bayonet slot 55, a user then rotates the sealing cap 50 about its longitudinal axis, such that the pin 17 travels along a circumferential second section of the bayonet slot 55. When the pin 17 reaches the end of the second section, a user may then release the sealing cap 50. The reactive force of the resilient element 60 will then urge the sealing cap 50 away from the first end of the transfer probe 10, such that the pin 17 is caused to travel into a third section of the bayonet slot 55. The third section is parallel to the first section. The first and third sections of the bayonet slot 55 are substantially perpendicular to the second section of the bayonet slot 55. When the user no longer applies any force to the sealing cap, which urges it into the first end of the transfer probe 10, the pins 17 will rest at the distal ends of the third section of the bayonet slots 55. This arrangement retains the sealing cap 50 on the first end of the transfer probe 10, preventing inadvertent release. In use, when an axial force is applied on the sealing cap so as to oppose the force of the resilient element 60, the pin 17 is caused to travel along the third section of the bayonet slot 55 with respect to the cap. To remove the sealing cap 50 from the first end of the transfer probe 10, a user must actively both push and twist the sealing cap 50, to urge the pin 17 along the third and second sections such that the sealing cap 50 can be removed from the first end of the transfer probe 10.

A benefit of a transfer line 1 embodying the present invention, such as that shown in the figures, is that the sealing cap 50 may provide an effective fluid (e.g. gas) seal against a surface engaged by the sealing cap 50.

Figure 3:
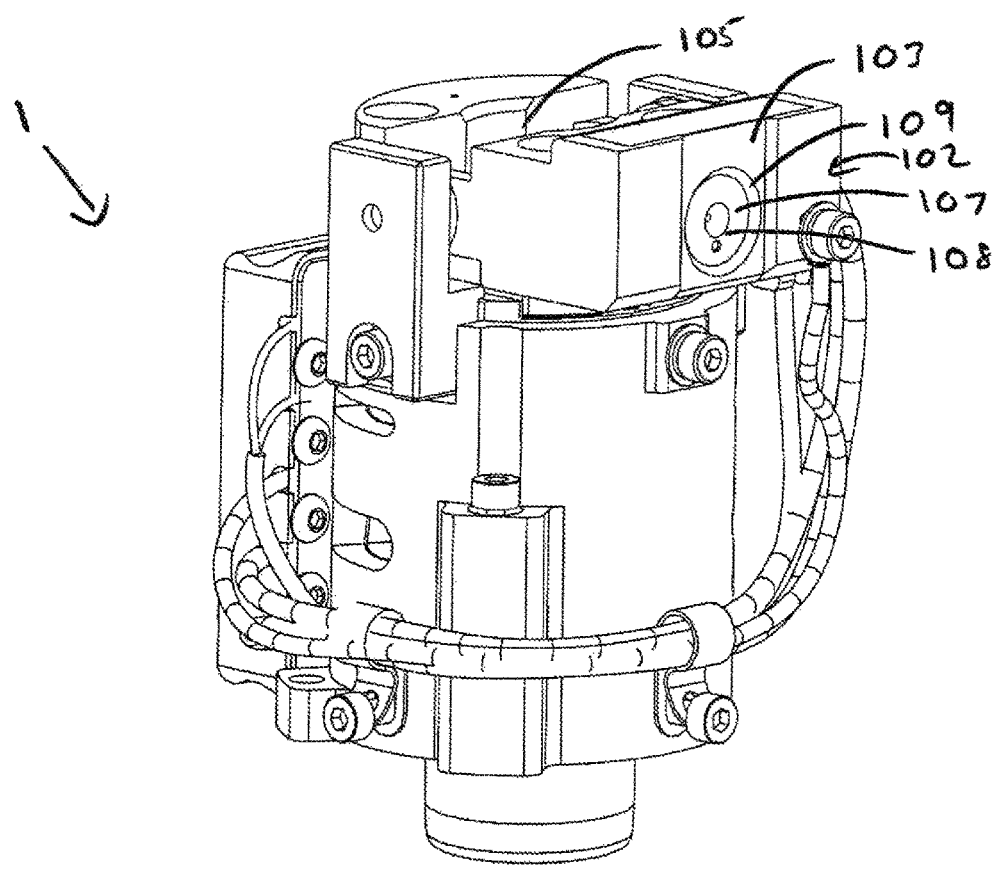
FIG. 3 illustrates a source block of an ion source of a GCMS arrangement for use with the transfer line of FIG. 1.

In use, as illustrated in FIGS. 4 and 5, the transfer line 1 may engage with a source assembly 100 of a mass spectrometer. A part of the source assembly 100 is shown in FIG. 3. FIG. 3 illustrates an outer source assembly 101 of a source assembly 100. The source assembly 100 comprises a source block 102. The source block 102 comprises a central aperture 105 which, in use, receives part of an inner source assembly 110 (shown in FIG. 5). For example, an ionisation chamber 106 of the inner source assembly 110 is received, in use, in the aperture 105 of the source block 102.

Figure 2B:
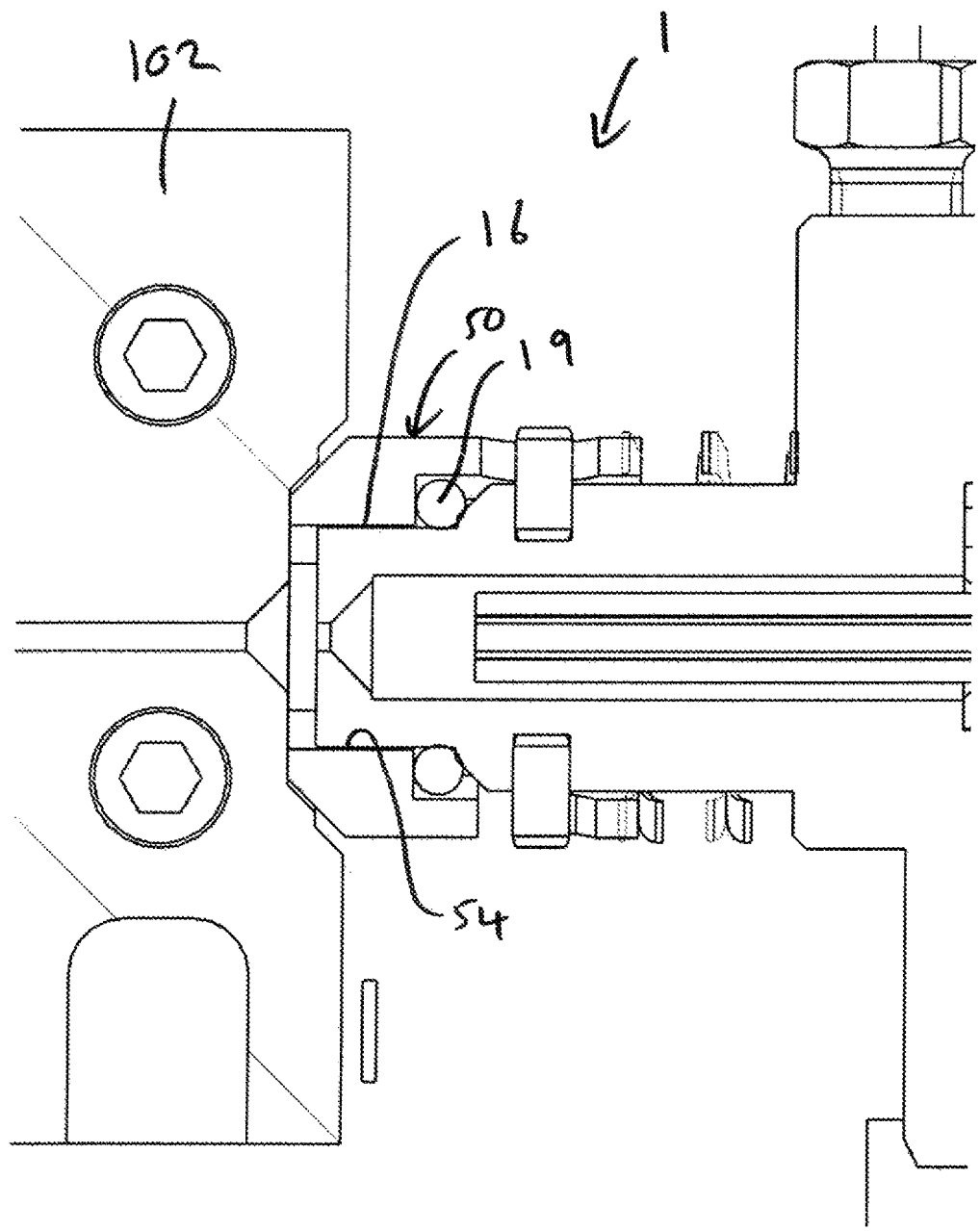
FIG. 2B illustrates a cross-section of part of a transfer line according to another embodiment of the present invention.

The source block 102 comprises an engagement surface 103. A recess 107 is provided in the engagement surface 103. A transfer port 108 is provided in the centre of the recess 107. The transport port 108 may be chamfered, as shown in FIGS. 2B, 4 and 5, in which the diameter of the transfer port 108 at the entrance is larger than the diameter of the main section of the transfer port 108. In at least one embodiment, the diameter of the entrance to the transfer port 108 is larger than the diameter of the outlet port 13. In at least one embodiment, the radius of the entrance to the transfer port 108 is equal to or larger than the distance between any auxiliary fluid transfer ports 22A, 22B. In embodiments comprising two auxiliary fluid transfers ports 22A, 22B diametrically opposed from one another, the diameter of the entrance port 108 may be equal to or larger than the distance between the auxiliary fluid transfer ports 22A, 22B. A benefit of the chamfered entrance to the transfer port 108 is that it may promote any auxiliary fluid(s) exiting the fluid transfer port(s) 22A, 22B to be incident on the angled chamfered surface of the transfer port 108, and promote the auxiliary fluid(s) to pass into and along the transfer port 108.

The surface of the recess 107 is arranged inwardly from the surface of the engagement surface 103. In the embodiment shown, a chamfered step 109 is provided at the intersection of the engagement surface 103 and the recess 107. The diameter and angle of the chamfered step 109 may substantially correspond to the radial chamfer surface 53 of the sealing cap 50. Likewise, the diameter of the axial sealing face 52 of the sealing cap 50 may be substantially the same as the diameter of the recess 107 of the source block 102. In at least one embodiment, both the surface of the recess 107 and the surface of the axial sealing face 52 of the sealing cap 50 may both be planar. In another embodiment, one or both may be non-planar, so as to promote an additional sealing interface therebetween.

In use, as shown in FIG. 4, when the transfer line 1 is engaged with the source block 102 of an ion source, a fluid connection is formed between the probe bore 11 of the transfer probe 10 and the transfer port 108 of the source block 102. A combination of a sliding connection between the surface 16 of the tip 15 of the transfer probe 10 and the cap aperture 52 of the sealing cap 50; and the sealing interface between the surface of the recess 107 and the axial sealing end face 52 of the sealing cap 50 promotes a substantial fluid seal between the transfer line 1 and the source block 102. This provides for the effective transfer of the sample and carrier gas from the GC column 40 into the source block 102 of the GCMS arrangement.

With reference to FIG. 4, when the GCMS arrangement is arranged as shown, the resilient element 60 may continue to be held under compression, such that it continues to urge the sealing cap 50 into engagement with the source block 102. Such an arrangement may maintain a good fluid sealing connection. Moreover, this arrangement may provide tolerance for slight misalignment of the transfer line 1 with respect to the source block 102.

The ion source 100 may need to be removed from the GCMS arrangement, for cleaning or replacement. One or both of the inner source 110 and the outer source 101 may be removed. The direction of removal and insertion of the ion source arrangement 100 is perpendicular to the longitudinal axis of the transfer line 1, as illustrated by the arrow 120 in FIG. 5. In known arrangements, in order to remove a source assembly, a transfer line must first be moved out of engagement with the source block, before the source block and/or the ion source can be removed. A benefit of the present invention is that the transfer line 1 need not be moved at all in order to remove and insert an ion source arrangement 100. Instead, during removal and insertion of an ion source arrangement, the sealing cap 50 is caused to translate linearly with respect to the transfer probe 10, allowing for the fluid (e.g. gas) seal to be broken and re-established, automatically, without any other adjustment of the GCMS arrangement being needed. Moreover, a transfer line 1 embodying the present invention may provide tactile and/or audio feedback when the ion source 100 is correctly installed. Specifically, when the sealing cap 50 is correctly aligned with the recess 107 on the source block 102, the spring force of the resilient element causes the axial sealing surface 52 of the sealing cap 50 to impact against the recess 107, creating a distinctive "click" which informs a user that the GCMS arrangement is correctly assembled. The impact of the sealing cap 50 in the recess 107 may also cause a small vibration to travel through the ion source structure, which a user may feel as they push the ion source into the mass spectrometer housing. Moreover, a user may observe the extension of the sealing cap 50 away from the transfer probe 10 when it is correctly aligned in the recess 107.

Prior to assembly of the source block 102 into the GCMS arrangement, the transfer port 108 of the source block 102 is substantially parallel to the transfer line 1. The source block 102 may then be translated in a direction perpendicular to the longitudinal axis of the transfer line 1. At this point, the spring force of the resilient element 60 causes the sealing cap 50 to extend away from the transfer probe 10 to its maximum extent, until the bayonet pins 17 engage against the distal end of the third section of the bayonet slots 55. As the source block 102 is brought into the GCMS arrangement, the sealing cap 50 engages with the edge of the engagement surface 103 of the source block 102. Specifically, the radial chamfer surface 53 of the sealing cap 50 engages with the edge of the engagement surface 103. The angle of the radial chamfer surface 53, and the continued translation of the source block 102 into the GCMS arrangement, creates a force which resists the spring force of the resilient element 60, thereby causing the sealing cap 50 to translate inwardly towards the transfer probe 10 (against the direction of the spring force of the resilient element 60).

The sealing cap 50 continues to be urged axially inwardly until the axial sealing end face 52 of the sealing cap 50 is substantially coplanar with the engagement surface 103. The source block may then be further translated until the transfer port 108 is substantially coaxial with the probe bore 11 of the transfer probe 10. At this point, the sealing cap 50 is caused to be received within the recess 107. The spring force of the resilient element 60 urges the sealing cap 50 into the recess 107. During the transition, the radial chamfer surface 53 of the sealing cap 50 effectively rides down the corresponding chamfer surface 109 on the source block 102.

A benefit of a transfer line embodying the present invention compared to the known arrangements is that the transfer line does not first need to be translated away from the source assembly before the, or parts of the, source assembly can be removed. Disassembly and reassembly of a GCMS arrangement incorporating a transfer line embodying the present invention may be easier and quicker than with known systems. To remove the outer source assembly from the transfer line, a user simply needs to retract the end of the GC column 40 from within the transfer port 108 of the source block, until the distal end of the GC column 40 rests within the transfer line 1. This prevents damage to, or shearing of, the GC column 40 as the outer source is removed. The retraction of the GC column 40 can be performed by a user reaching into the GC oven (when switched off) and pulling the GC column 40 into the GC oven, at least by a distance equal to the length of the transfer port 108 of the source block.

Figure 12A:
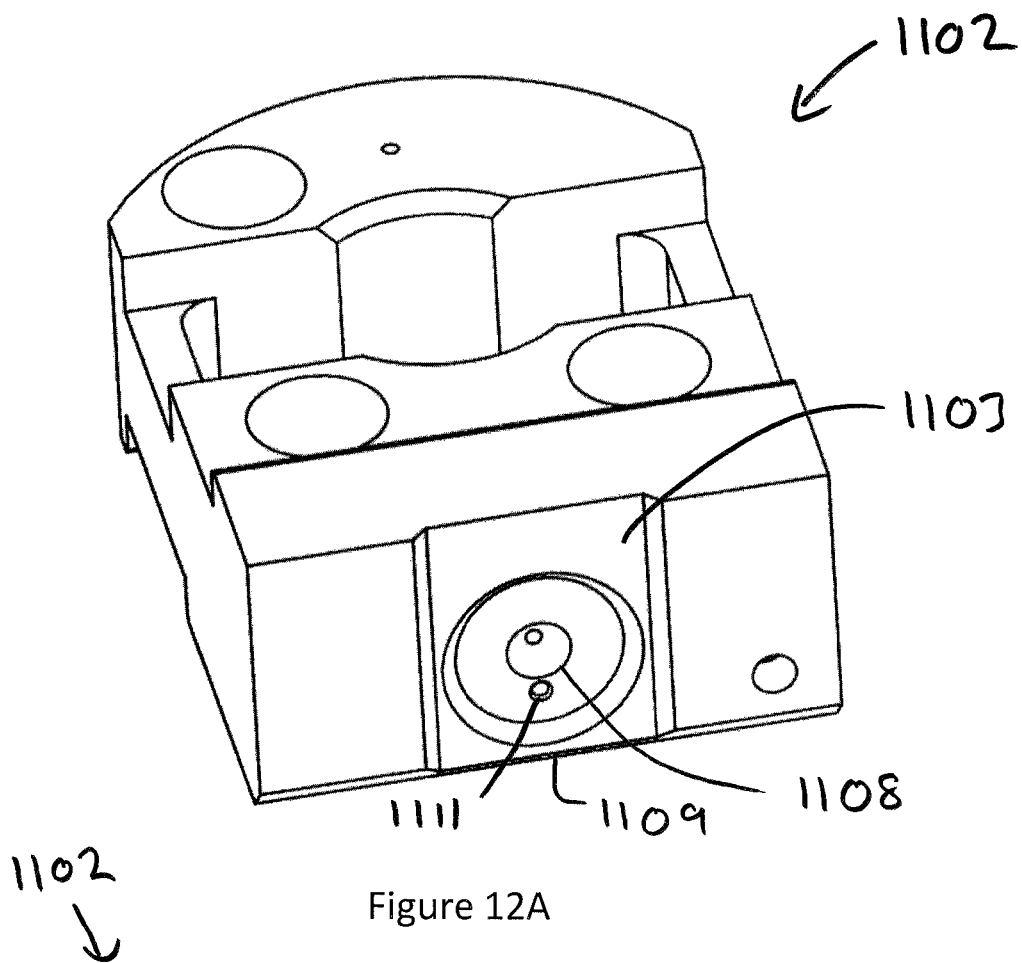
FIG. 12A illustrates a source assembly according to one aspect of the present invention.
Figure 12B:
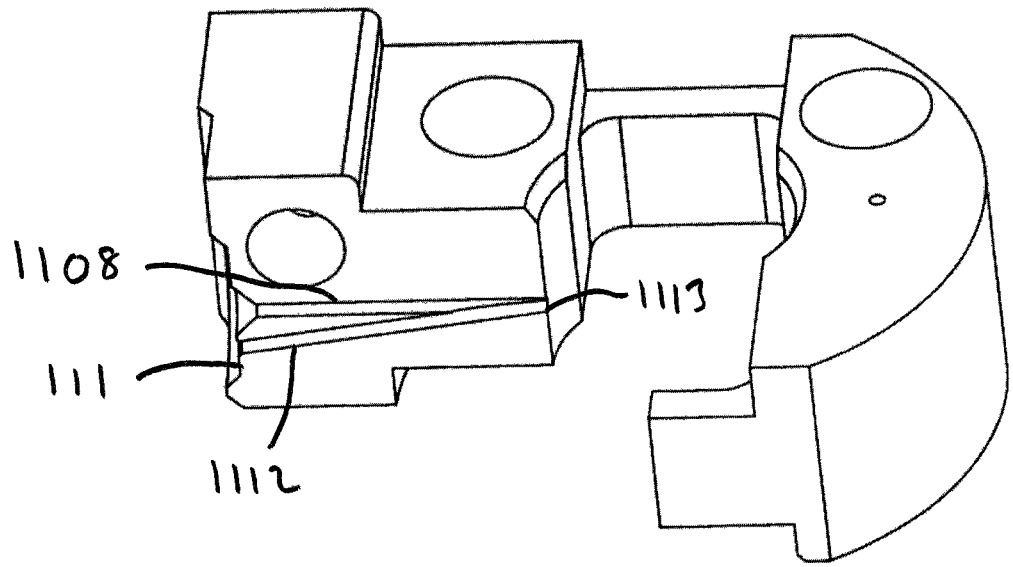
FIG. 12B illustrates a partial cut-away view of the arrangement of FIG. 12A.

FIGS. 12A and 12B illustrate a source block 1102 according to an embodiment of the present invention. The source block 1102 of FIGS. 12A and 12B is similar to the source block 102 of FIGS. 2B, 3, 4 and 5, and like components are denoted by like numbers. The source block 1102 differs to source block 102 by the provision of at least one auxiliary fluid transfer channel 1112, comprising an auxiliary transfer channel inlet port 1111 on the surface of the recess 1107.

As shown in the cut-away illustration of FIG. 12B, the auxiliary fluid transfer channel 1112 converges to meet the transfer port 1108 at a source block outlet port 1113. This arrangement allows for any auxiliary fluids to exit the source block 1102 substantially along with the GC eluent. In one embodiment, the GC column 40 terminates at the source block outlet port 1113.

The auxiliary fluid transfer channel 1112 may be for receiving CI gas from the transfer line 1 in use.

The auxiliary fluid transfer channel 1112 may be cross-drilled in the source block 1102. In the embodiment illustrated in FIG. 12B, the auxiliary fluid transfer channel 1112 is not parallel to the transfer port 108. Other arrangements are possible, so long as the path of the auxiliary fluid transfer channel 1112 meets the transfer port 108 at or before the source block outlet port 1113.

The junction of the channel 1112 and transfer port 108 may be made further upstream.

In the embodiment shown, the auxiliary transfer channel inlet port 1111 is positioned so as to be aligned with a corresponding auxiliary fluid transfer port 22A, 22B provided on the transfer probe 10, so as to receive auxiliary gas therefrom. The source block outlet port 1113 is provided on the internal surface of the central aperture 105 of the source block 102. The source block outlet port 1113 is intended to align with a corresponding aperture in an ionisation chamber 106 receivable in the central aperture 105. Accordingly, the GC eluent and any auxiliary fluid(s) are introduced into the ionisation chamber 106 substantially simultaneously.

In the arrangement of FIGS. 12A and 12B, the transfer port 108 may not be chamfered, or the diameter of the chamfered transfer port may be smaller, since any auxiliary fluids are intended to be received in the corresponding auxiliary transfer channel inlet port 1111.

Auxiliary Fluid Bore

Another aspect of the present invention comprises a transfer line for a GCMS arrangement, the transfer line comprising a transfer probe 10 having a probe bore 11 to receive a GC column 40. The transfer line 1 further comprises at least one auxiliary fluid bore 20A, 20B for delivering at least one auxiliary fluid to the first end of the transfer probe 10. In the embodiment shown in FIGS. 6 and 7, there are two auxiliary fluid bores 20A, 20B. There may alternatively be one auxiliary fluid bore. There may alternatively be three or more auxiliary fluid bores. In FIG. 6, the two auxiliary fluid bores 20A, 20B are shown as being diametrically opposed from one another, with the probe bore 11 being arranged therebetween. This is not essential. Any arrangement of the auxiliary fluid bores 20A, 20B with respect to the probe bore 11 may be adopted. In the embodiment shown, the at least one auxiliary fluid bore 20A, 20B is substantially parallel to the probe bore 11. This is not essential. With reference to FIG. 7, the axial length of the at least one auxiliary fluid bore 20A, 20B may be less than the axial length of the probe bore 11. The angle of the auxiliary fluid supply ports 21A, 21B may be like that shown in FIG. 6, or a different arrangement. The auxiliary fluid supply ports 21A, 21B may be substantially parallel to one another, allowing fluid connections to be made to each of the auxiliary fluid ports 21A, 21B from one side of the transfer line.

With a transfer line embodying the present invention, there is no need for a user/technician to separately connect any auxiliary fluid lines to the MS unit after the transfer line has been mated with the MS unit.

Inwardly Extending Legs

Figure 8:
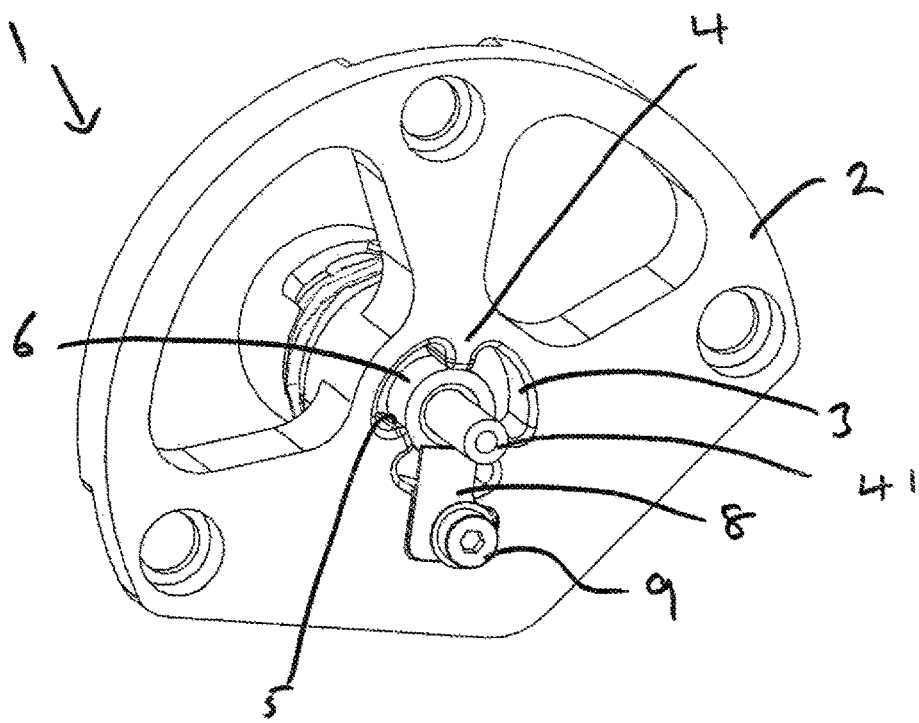
FIG. 8 illustrates another part of the transfer line illustrated in FIG. 1.

Another aspect of the present invention is shown in FIG. 8. In this arrangement, the transfer line 1 for a GCMS arrangement comprises a manifold 2 to retain a GC column 40 (not shown) in the transfer line 1. The manifold 2 comprises an aperture 3 provided with three radially extending legs 4. In the arrangement shown in FIG. 8, there are three radially extending legs 4, substantially equally spaced around the circumference of the aperture 3. This is not essential. There may be two radially inwardly extending legs 4. There may be four or more radially inwardly extending legs 4. A distal end 5 of each of the radially inwardly extending legs 4 serve collectively to retain a GC column therein.

In the arrangement shown, there is further provided a GC column holder 6 which is retained between the legs 4. The GC column holder 6 comprises a holder bore 7 to receive the GC column therein. The GC column may be received in a sleeve 41, comprising an outer tube 43 and an inner tube 44, as shown in FIG. 2. The GC column holder 6 is also shown in FIG. 2.

The GC column holder 6 is generally tubular. In at least one embodiment, the GC column holder 6 is comprised of ceramic. In at least one embodiment, the outer surface of the sleeve 41 does not contact the probe bore 11. The sleeve 41 may only contact the GC column holder 6. The sleeve 41 may be received within the GC column holder 6 with a sliding fit. In one embodiment, the dimensions of the sleeve 41 and GC column holder 6 are configured to reduce fluid leakage.

In at least one embodiment, there may be a retainer 8 to retain the GC column holder 6 in place, against the manifold 2 and thus between the legs 4. The retainer may comprise a retaining plate 8 and be secured to the manifold 2 with a screw 9. In at least one embodiment, the retaining plate 8 may apply a force on the axial end of the GC column holder 6 in use. The retaining plate 8 may be comprised of a resilient material. The axial length of the GC column holder 6 may be larger than the depth of the aperture in which it is arranged, such that when a proximal end of the retaining plate 8 is secured flush to the manifold 2 (by the screw 9) the retaining plate 8 is caused to bend, and the distal end applies a spring force on the axial end of the GC column holder 6. The retaining plate 8 may be substantially thermally insulating, such that no or little heat is transferred from the manifold 2 to the GC column holder 6 via the retaining plate 8. The retaining plate 8 may take other forms. There may be more than one retaining plate 8.

A benefit of the arrangement shown in FIG. 8 is that the only physical contact between the GC column 40 and the manifold 2 is via the radially inwardly extending legs 4. By minimizing the surface area of the end 5 of the radially extending legs 4, an effective thermal barrier may be created between the manifold 2 and the GC column 40. This arrangement may help to minimize heat loss from a heater associated with the GC column 40. Accordingly, the GC column holder 6 preferably minimizes or reduces any heat loss along the axial length of the sleeve 41. If there was to otherwise be a larger thermal bridge between the sleeve 41 and the manifold 2, the manifold 2 would act to serve as a heat sink, causing a reduction in the temperature of the sleeve 41 towards the first end of the transfer probe 10, which may affect the chromatographic performance.

The ends 5 of the radially inwardly extending legs 4 may be provided with gripping features which engage with an outer surface of the GC holder 6.

Mounting Assembly

Another aspect of the present invention provides a mounting assembly 150 for a GCMS arrangement comprising a manifold 2 of a transfer line 1 to retain a GC column 40 in the transfer line 1. The mounting assembly 150 further comprises a mounting platform 151. The mounting platform 151 may comprise part of a flange assembly for connection to a mass spectrometer. The flange of the mounting platform 151 may comprise a sealing O-ring 159 as shown in FIG. 1. This is not essential. A seal may alternatively or additionally be provided on the housing of the mass spectrometer. The manifold 2 is axially spaced from the mounting platform 151 by a plurality of pillars 152, 153, 154. In the embodiment shown, one of the pillars 152, 153, 154 is for providing position. Another of the pillars 152, 153, 154 is for providing orientation. The third of the pillars 152, 153, 154 is for providing stability to the system. In other embodiments, there may be fewer or more than three pillars 152, 153, 154. The provision of the mounting assembly 150 may provide space for the routing of sensor wires and other utilities for the components of the GCMS arrangement, such as the heater and temperature sensors. In the embodiment shown, the pillars 152, 153, 154 are generally cylindrical, although this is not essential. In the arrangement shown, the pillars 152, 153, 154 are substantially equally spaced around the circumferences of transfer line 1. This is not essential.

Another aspect of the present invention provides a mounting assembly 150 for a GCMS arrangement. The mounting assembly 150 comprises a transfer probe 1 to receive a GC column 40. The transfer probe 1 further comprises at least one auxiliary fluid bore (one shown in FIG. 9) for delivering at least one auxiliary fluid to the first end of the transfer probe 1.

The mounting assembly 150 further comprises a mounting platform 151 comprising at least one auxiliary fluid supply port 155 in fluid connection with the at least one auxiliary fluid bore 20B and connectible to an auxiliary fluid supply 156 in use. The mounting assembly 150 further comprises a connecting conduit 157 fluidly connected between the at least one auxiliary fluid supply port 155 and the at least one auxiliary fluid bore 20B. The connecting conduit 157 may comprise first 158A and second 158B terminal connectors for respective connection to the transfer line 1 and the auxiliary fluid support port 155. The auxiliary supply port 155 effectively provides a bolt head to which the auxiliary fluid supply 156 can be connected and disconnected by a user in use. The benefit of the mounting assembly 150 embodying the present invention is that a user/technician should not need to disassemble or reassemble the connecting conduit 157 in use. The user/technician serviceable elements (155) of the mounting assembly 150 are therefore arranged remotely from the transfer line 1, so as to avoid damage thereto. Moreover, there is no (or a reduced) need to for a user/technician to bend any tubing prior to installation, or for extensive leak testing. A further benefit is that the user/technician serviceable elements (155) of the mounting assembly 150 are provided external to the MS unit (and thus unvented, at atmospheric pressure), allowing the supply of auxiliary fluids to be replaced without the need to vent the MS unit.

Furthermore, the provision of the auxiliary fluid supply port(s) 155 on the mounting platform 151 is more convenient for a user to access.

Figure 9:
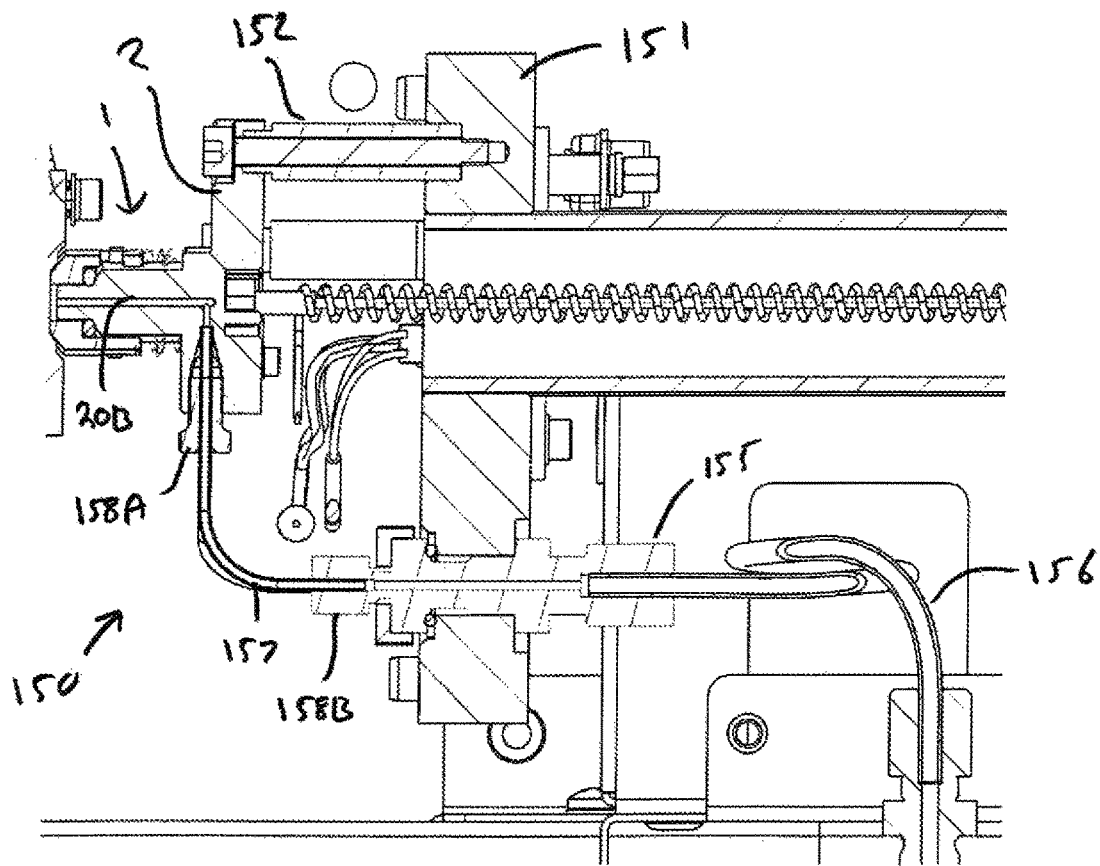
FIG. 9 illustrates a cross-section of a transfer line embodying the present invention.
Figure 11:
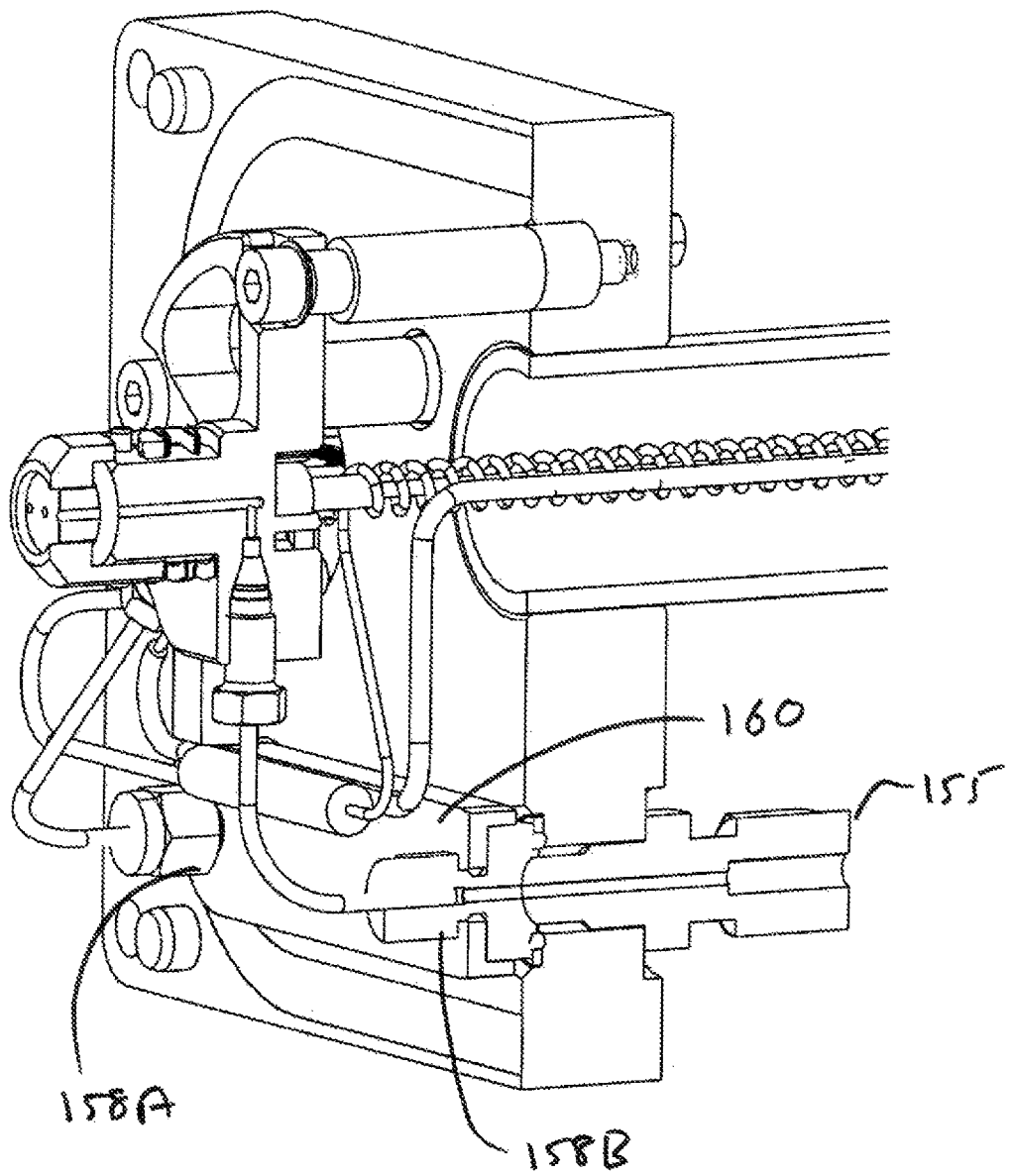
FIG. 11 illustrates a cross-section of a transfer line according to another embodiment of the present invention.

FIG. 11 illustrates the arrangement shown in FIG. 9, but with an additional locking bar 160 extending between the first 158A and second 158B terminal connectors. The locking bar 160 serves to prevent rotation of the first 158A and second 158B terminal connectors. In at least one embodiment, a recess on the locking bar 160 may engage with a corresponding protrusion on the first 158A or second 158B terminal connector. The recess/protrusion comprises a keying feature, to prevent rotation of the recess relative to the protrusion. The recess/protrusion may be hexagonal (e.g. a nut or bolt head). The locking bar 160 may serve to prevent vacuum-side fluidic connections from being moved, twisted or damaged when external nuts on the atmospheric side of a union are being manipulated or tightened.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

Sealing Cap

A1 A transfer line for a GCMS arrangement, the transfer line comprising:
  a transfer probe having a probe bore to receive a GC column;
  a sealing cap movably mounted at a first end of the transfer probe; and
  a resilient element arranged to bias the sealing cap away from the first end of the transfer probe.

A2. A transfer line according to clause A1, further comprising a sleeve received within the probe bore, the sleeve having a sleeve bore to receive the GC column.

A3. A transfer line according to clause A2, wherein the sleeve comprises an outer tube and an inner tube, the inner tube having an inner tube bore to receive the GC column.

A4. A transfer line according to clause A3, wherein the outer tube is comprised of copper.

A5. A transfer line according to any of clauses A3 and A4, wherein the inner tube is comprised of stainless steel.

A6. A transfer line according to any of clauses A2 to A5, wherein the first end of the sleeve is spaced axially inwardly from the first end of the transfer probe.

A7. A transfer line according to any of clauses A1 to A6, wherein the probe bore comprises an outlet port at said first end of the transfer probe.

A8. A transfer line according to any of clauses A1 to A7, wherein the transfer probe comprises a tip at said first end, the outer surface of said tip being substantially cylindrical.

A9. A transfer line according to any of clauses A1 to A8, wherein said sealing cap is generally cylindrical and arranged to receive at least a part of the first end of the transfer probe therein.

A10. A transfer line according to any of clauses A1 to A9, wherein the sealing cap comprises an axial sealing face.

A11. A transfer line according to clause A10, wherein the sealing face is surrounded by a radial chamfer surface.

A12. A transfer line according to any of clauses A1 to A11, wherein the sealing cap comprises a cap aperture.

A13. A transfer line according to clause A12, wherein the cap aperture receives the first end of the transfer probe with a sliding fit.

A14. A transfer line according to any of clauses A1 to A12, further comprising a sealing element arranged between the sealing cap and the transfer probe.

A15. A transfer line according to any of clauses A1 to A14, wherein the resilient element is a spring.

A16. A transfer line according to clause A15, wherein the resilient element is integrally formed with the sealing cap.

A17. A transfer line according to any of clauses A1 to A8, wherein the sealing cap is receivable in the first end of the transfer probe.

A18. A transfer line according to any of clauses A1 to A17, wherein the sealing cap is comprised of vespel SCP-5000.

A19. A transfer line according to any of clauses A1 to A18, wherein the transfer probe further comprises at least one auxiliary fluid bore, for delivering at least one auxiliary fluid to the first end of the transfer probe.

A20. A transfer line according to clause A19, wherein the at least one auxiliary fluid bore is substantially parallel to the probe bore.

A21. A transfer line according to any of clauses A17 to A18, wherein the transfer probe further comprises at least one auxiliary fluid supply port, for supplying at least one auxiliary fluid to the auxiliary fluid bore.

A22. A transfer line according to any of clauses A19 to A21, wherein the first end of the transfer probe comprises at least one auxiliary fluid transfer port in fluid communication with the at least one auxiliary fluid bore.

A23. A transfer line according to any of clauses A1 to A22, wherein the sealing cap is selectively retained on the transfer probe.

A24. A transfer line according to clause A23, wherein the sealing cap is retained on the transfer probe with a bayonet fitting.

GCMS Arrangement

B1. A GCMS arrangement comprising:
  a transfer line according to any of clauses A1 to A23; and
  a source block for an ion source, the source block comprising an engagement surface provided with a transfer port for fluid communication with the transfer line, configured such that, in use, the engagement surface causes the sealing cap to be displaced relative to the transfer probe until the probe bore of the sealing cap is substantially aligned with the transfer port.

B2. A GCMS arrangement according to clause B1, wherein the transfer port is provided in a recess in the engagement surface.

B3. A GCMS arrangement according to clause B2, wherein the recess is chamfered.

B4. A method of assembling a GCMS arrangement comprising:
  providing a transfer line according to any of clauses A1 to A23;
  providing a source block for an ion source, the source block comprising an engagement surface provided with a transfer port;
  arranging the source block such that transfer port is parallel to the transfer line;
  translating the source block in a direction perpendicular to the longitudinal axis of the transfer line until the sealing cap of the transfer line engages with the engagement surface of the source block, causing the sealing cap to be displaced inwardly on the transfer probe;
  translating the source block further in said direction until the probe bore of the transfer probe is substantially co-axial with the transfer port of the source block.

B5. A method according to clause B4, wherein the transfer port is provided in a recess in the engagement surface and when the probe bore of the transfer probe is substantially co-axial with the transfer port of the source block, the resilient element causes the sealing cap to be received in the recess.

Auxiliary Fluid Bore

C1. A transfer line for a GCMS arrangement, the transfer line comprising a transfer probe having:
  a probe bore to receive a GC column; and
  at least one auxiliary fluid bore, for delivering at least one auxiliary fluid to the first end of the transfer probe.

C2. A transfer line according to clause C1, wherein the at least one auxiliary fluid bore is substantially parallel to the probe bore.

C3. A transfer line according to any of clauses C1 to C2, wherein the transfer probe further comprises at least one auxiliary fluid supply port, for supplying at least one auxiliary fluid to the auxiliary fluid bore.

C4. A transfer line according to any of clauses C1 to C3, wherein the first end of the transfer probe comprises at least one auxiliary fluid transfer port in fluid communication with at least one auxiliary fluid bore.

Inwardly Extending Legs

D1. A transfer line for a GCMS arrangement, the transfer line comprising a manifold to retain a GC column in the transfer line, the manifold comprising an aperture provided with at least two radially inwardly extending legs to retain said GC column.

D2. A transfer line according to clause D1, wherein the manifold comprises three radially inwardly extending legs.

D3. A transfer line according to any of clauses D1 to D2, wherein the legs are substantially equally spaced around the circumference of the aperture.

D4. A transfer line according to any of clauses D1 to D3, further comprising a GC column holder retained between the legs and comprising a holder bore to receive a GC column therein.

D5. A transfer line according to any of clauses D1 to D4, wherein the GC column holder is tubular.

D6. A transfer line according to any of clauses D4 and D5, further comprising a sleeve received in the GC column holder, the sleeve having a sleeve bore to receive the GC column.

D7. A transfer line according to clause D6, wherein the sleeve comprises an outer tube and an inner tube, the inner tube having an inner tube bore to receive the GC column.

D8. A transfer line according to any of clauses D4 to D7, wherein the GC column holder is comprised of ceramic.

D9. A transfer line according to any of clauses D4 to D8, further comprising at least one retainer to retain the GC column holder in the aperture.

Mounting Assembly

E1. A mounting assembly for a GCMS arrangement, comprising:
 a manifold of a transfer line to retain a GC column in the transfer line; and
 a mounting platform,
 the manifold axially spaced from the mounting platform by a plurality of pillars.

E2. A mounting assembly according to clause E1, wherein the mounting platform comprises a substantially planar mounting plate; and the manifold comprises a substantially planar manifold plate, the mounting plate and manifold plates being arranged substantially parallel to one another.

E3. A mounting assembly according to any of clauses E1 and E2, wherein the pillars are substantially equally spaced around the circumference of the transfer line.

E4 A mounting assembly for a GCMS arrangement, comprising:
 a transfer probe having:
  a probe bore to receive a GC column; and
  at least one auxiliary fluid bore for delivering at least one auxiliary fluid to the first end of the transfer probe; and
 a mounting platform comprising at least one auxiliary fluid supply port in fluid connection with the at least one auxiliary fluid bore and connectable to an auxiliary fluid supply.

E5. A mounting assembly according to clause E4, further comprising a connecting conduit fluidly connected between the at least one auxiliary fluid support port and the at least one auxiliary fluid bore.

E6 A mounting assembly according to clause E4, comprising two auxiliary fluid supply ports, and further comprising a locking bar extending between the fluid supply ports to substantially prevent rotation of the auxiliary fluid supply ports.

Source Block

F1 A source block for an ion source, the source block comprising an engagement surface for engagement with a transfer probe in use, the transfer probe having a probe bore to receive a GC column and at least one auxiliary fluid bore, the probe bore and the at least one auxiliary fluid bore terminating on an axial end face of the transfer probe and spaced apart from one another,
 wherein the source block comprises a transfer port and at least one auxiliary fluid transfer channel, wherein the transfer port and at least one auxiliary fluid transfer channel are arranged so as to substantially align, in use, with a respective one of the probe bore and at the at least one auxiliary fluid bore.

F2. A source block according to clause F1, wherein the transfer port and at least one auxiliary fluid channel are fluidly connected to one another remote from the engagement surface.

F3. A source block according to any of clauses F1 and F2, wherein the transfer port and at least one auxiliary fluid channel are non-parallel.

F4. A source block according to any of clauses F1 to F3, further comprising a source block outlet port and wherein the transfer port and at least one auxiliary fluid transfer channel are fluidly connected to the source block outlet port.

F5. A source block according to any of clauses F1 to F4, wherein the at least one auxiliary fluid transfer channel is fluidly connected to the transfer port along its axial length.

The invention claimed is:

1. A transfer line for a gas chromatography mass spectrometer (GCMS) arrangement, the transfer line comprising:
 a transfer probe having a probe bore to receive a gas chromatography (GC) column;
 a sealing cap movably mounted for linear translation at a first end of the transfer probe; and
 a bias element arranged to bias the sealing cap away from the first end of the transfer probe.

2. A transfer line according to claim 1, further comprising a sleeve received within the probe bore, the sleeve having a sleeve bore to receive the GC column.

3. A transfer line according to claim 2, wherein the first end of the sleeve is spaced axially inwardly from the first end of the transfer probe.

4. A transfer line according to claim 1, wherein the transfer probe comprises a tip at the first end, the outer surface of the tip being substantially cylindrical.

5. A transfer line according to claim 1, wherein the sealing cap is generally cylindrical and arranged to receive at least a part of the first end of the transfer probe therein.

6. A transfer line according to claim 1, wherein the sealing cap comprises an axial sealing face and the sealing face is surrounded by a radial chamfer surface.

7. A transfer line according to claim 1, wherein the sealing cap comprises a cap aperture for receiving the first end of the transfer probe with a sliding fit.

8. A transfer line according to claim 1, wherein the bias element is a spring.

9. A transfer line according to claim 1, wherein the transfer probe further comprises at least one auxiliary fluid bore for delivering at least one auxiliary fluid to the first end of the transfer probe.

10. A transfer line according to claim 9, wherein the at least one auxiliary fluid bore is substantially parallel to the probe bore.

11. A transfer line according to claim 9, wherein the transfer probe further comprises at least one auxiliary fluid supply port for supplying at least one auxiliary fluid to the auxiliary fluid bore.

12. A transfer line according to claim 9, wherein the first end of the transfer probe comprises at least one auxiliary fluid transfer port in fluid communication with the at least one auxiliary fluid bore.

13. A transfer line according to claim 1, wherein the sealing cap is selectively retained on the transfer probe with a bayonet fitting.

14. A transfer line according to claim 1, further comprising:
a source block for an ion source, the source block comprising an engagement surface provided with a transfer port for fluid communication with the transfer line, configured such that, in use, the engagement surface causes the sealing cap to be displaced relative to the transfer probe until the probe bore of the sealing cap is aligned with the transfer port.

15. A transfer line according to claim 14, wherein the transfer port is provided in a recess in the engagement surface.

16. A transfer line according to claim 1, further comprising a manifold to retain a GC column in the transfer line, the manifold comprising an aperture provided with at least two radially inwardly extending legs to retain the GC column.

17. A transfer line according to claim 1, further comprising:
a manifold to retain a GC column in the transfer line; and
a mounting platform,
the manifold axially spaced from the mounting platform by a plurality of pillars.

18. A transfer line according to claim 1, wherein the transfer probe comprises:
at least one auxiliary fluid bore for delivering at least one auxiliary fluid to the first end of the transfer probe; and
a mounting platform comprising at least one auxiliary fluid supply port in fluid connection with the at least one auxiliary fluid bore and connectable to an auxiliary fluid supply.

19. A method of assembling a gas chromatography mass spectrometer (GCMS) arrangement comprising:
providing a transfer line comprising:
a transfer probe having a probe bore to receive a gas chromatography (GC) column;
a sealing cap movably mounted for linear translation at a first end of the transfer probe; and
a bias element arranged to bias the sealing cap away from the first end of the transfer probe,
providing a source block for an ion source, the source block comprising an engagement surface provided with a transfer port;
arranging the source block such that the transfer port is parallel to the transfer line;
translating the source block in a direction perpendicular to a longitudinal axis of the transfer line until the sealing cap of the transfer line engages with the engagement surface of the source block, causing the sealing cap to be displaced linearly inwardly on the transfer probe; and
translating the source block further in the direction until the probe bore of the transfer probe is substantially co-axial with the transfer port of the source block.

20. A system comprising:
a transfer line comprising:
a transfer probe having a probe bore to receive a gas chromatography column;
a sealing cap movably mounted for linear translation at a first end of the transfer probe; and
a bias element arranged to bias the sealing cap away from the first end of the transfer probe,
the transfer probe having at least one auxiliary fluid bore, the probe bore and the at least one auxiliary fluid bore terminating on an axial end face of the transfer probe and spaced apart from one another; and
a source block for an ion source, the source block comprising an engagement surface for engagement with the transfer probe in use, wherein the source block comprises a transfer port and at least one auxiliary fluid transfer channel, wherein the transfer port and the at least one auxiliary fluid transfer channel are arranged so as to substantially align, in use, with a respective one of the probe bore and at the at least one auxiliary fluid bore.

\* \* \* \* \*